Inventor: Charles D. Wagner
By: [signature]
His Attorney

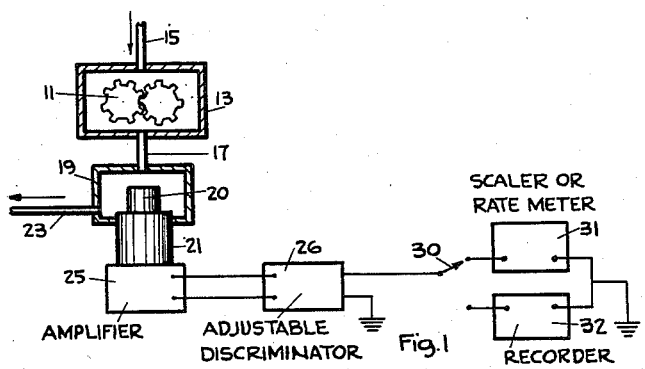
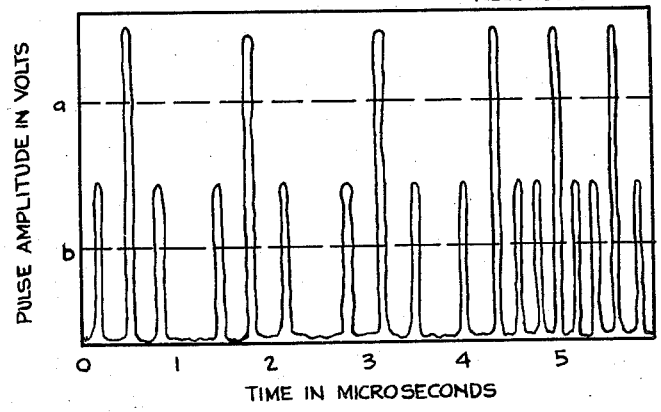
Fig. 2
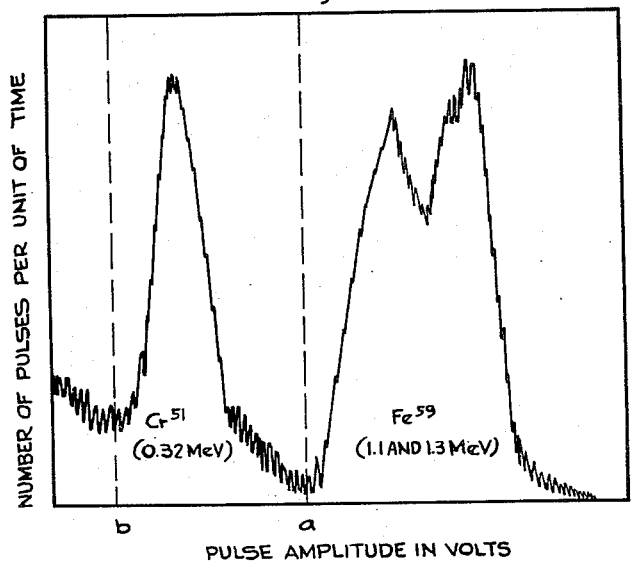
Fig. 3

United States Patent Office 2,811,650
Patented Oct. 29, 1957

2,811,650

RADIOLOGICAL WEAR MEASUREMENT METHOD

Charles D. Wagner, Concord, Calif., assignor to Shell Development Company, Emeryville, Calif., a corporation of Delaware Application November 13, 1953, Serial No. 391,894

8 Claims. (Cl. 250—83.3)

This invention pertains to the measurement of the attrition or wear of surfaces moving in frictional contact with each other, and relates more particularly to a radiological method for determining or measuring the respective wear of each of two metallic members such as gears, piston rings, cylinder walls, bearings, journals, etc. frictionally engaging each other.

It has been known to measure the wear of metallic objects by determining the loss of weight or the decrease in dimensions of said metallic objects. These methods of measurement have the drawbacks of lacking sufficient accuracy when dealing with very small amounts of wear, and of being applicable only after the completion of a test and not during the progress thereof.

It has therefore been proposed, notably in U. S. Letters Patent 2,315,845 to S. W. Ferris, to effect these measurements by radiological means. For this purpose, the metallic members whose attrition it is desired to measure are rendered radioactive, either by incorporating in their composition suitable radioactive matter, or by artificially activating said members through irradiation or bombardment with particles such as neutrons or deuterons.

The metallic members thus activated are then subjected to frictional wear in the presence of a fluid capable of carrying away radioactive wear products or debris, and the radioactivity of said carrier fluid is measured at suitable times during the test. Knowing the quantity of radioactive material in the test member the amount of wear can be readily determined from these measurements of radioactivity of the fluid.

The method outlined above, although capable of accurately measuring the total amount of wear produced by the mutual attrition of two metallic members, or of the wear of either member alone, cannot be used to determine the respective amounts contributed to this total by each of the rubbing parts during a single experiment.

Since it is very important in many applications of industrial testing to discriminate between said respective amounts in order, for example, that proper conclusions might be drawn as to possible improvements in the design or the material of each particular member under test, and since it is important to do this in single experiments rather than successive experiments to permit accurate control of experimental variables, it is an object of this invention to provide a method permitting of such discrimination.

It is also an object of this invention to provide a method of the type described, wherein discrimination between the respective amounts of wear products contributed by each of two metallic members in frictional engagement with each other is made possible by including in the composition of one of said parts a radioactive isotope or isotopes emitting gamma rays of energy distribution different from that of the isotope or isotopes included in the composition of the other part.

It is also an object of this invention to provide a method of the type described, wherein different radioactive isotopes of the same or different metals are used in the two members under test.

It is also an object of this invention to provide a method of the type described, wherein the same radioactive isotopes are used in both friction members, but where the concentration ratios of the isotopes are different in the two members.

It is also an object of this invention to provide a method where the discrimination between two radioactive wear products is made possible through the use of a scintillation counter capable of discriminating between radiations of different orders or levels of energy.

These and other objects of this invention will be understood from the following description taken with reference to the attached drawings, wherein:

Fig. 1 shows a diagrammatic arrangement of apparatus used in practicing the present invention;

Fig. 2 is a graph illustrating the type of electrical pulses to be counted or recorded according to the present invention;

Fig. 3 illustrates typical plot of pulse height distribution obtained with a gamma-emitting isotope and a suitable scintillation spectrometer;

Figure 4:
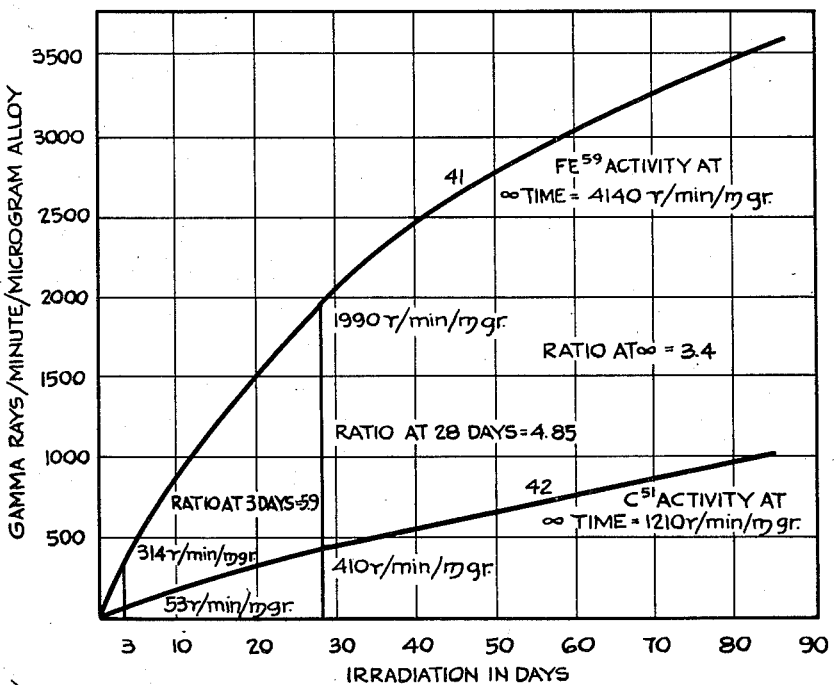
Figs. 4 and 5 are graphs of the rise and fall of specific activity of isotopes $Fe^{59}$ and $Cr^{51}$ during the periods of neutron activation and decay.

For the sake of simplicity, this invention will be described with regard to the measurement of the amounts of wear products due to frictional attrition of two mechanical members consisting of or comprising two elements such as iron and chromium, the radioactive isotope of iron used being $Fe^{59}$, and that of chromium being $Cr^{51}$. It is, however, understood that such description is purely illustrative and that many radioactive isotopes of other elements may equally be used. The table hereinbelow lists as examples a few isotopes which may be produced in the Clinton pile and which are suitable for the purposes of this invention:

| Radio Isotope | Half Life Time | Emergy ($\gamma$), m. e. v. | Remarks |
|---|---|---|---|
| Antimony 124 | 60 days | 0.60, 0.71, 1.71 | |
| Antimony 125 | 2.7 years | Variety through 0.637 | By neutron irradiation of tin. |
| Barium 131 | 12 days | 0.26 | |
| Cadmium 115 | 43 days | 0.5 | |
| Chromium 51 | 26.5 days | 0.32 | |
| Cobalt 60 | 5.3 years | 1.17, 1.33 | |
| Gold 198 | 2.7 days | 0.411 | |
| Gold 199 | 3.3 days | Variety through 0.231 | By irradiation of platinum. |
| Iron 59 | 46.3 days | 1.1, 1.3 | |
| Selenium 75 | 127 days | Variety through 0.405 | |
| Silver 110 | 270 days | 0.885, 0.935, 1.39, 1.52 | |
| Tungsten 185 | 73 days | 0.134 | |

Assuming that the members to be tested are two gears, the method of the present invention may be carried out in several ways.

Thus, one of the gears may be made of a material such as chromium or a suitable alloy thereof while the other gear is made of a different material, such as iron or a suitable alloy thereof. The two gears are subjected, in well known manner, to an irradiation treatment by pile activation designed to convert the chromium of one gear into radioactive isotope $Cr^{51}$ emitting gamma rays of 0.32 m. e. v. energy, while the iron of the other gear is similarly converted into radioactive isotope $Fe^{59}$ emitting gamma rays of 1.1 and 1.3 m. e. v. energy.

Referring to Fig. 1, the two radioactivated gears 11 and 12 are then placed in a testing apparatus diagrammatically shown at 13, such for example an extreme pressure lubricant testing machine, a kinetic oiliness tester, and the like. If it is desired to carry out the present testing method as a continuous process, the two gears are rotated, by conventional means, not shown in the drawing, in frictional engagement with each other in the presence of a lubricating fluid supplied to the apparatus or housing 13 through a pipe 15. If desired, a suitable abrasive material may be added to the lubricant to accelerate attrition, or an experimental wear inhibitor may be added to test its effectiveness. The lubricant, which is capable of carrying the radioactive frictional wear products away, is then passed through a pipe 17 to a housing 19 containing the crystal 20 of a scintillation counter having an electron multiplier 21. The crystal 20, for example, a thallium activated sodium iodide crystal, is preferably enveloped by an aluminum sheath sufficiently thick to prevent alpha or beta particles which may be emitted by the radioactive debris from registering in the scintillation counter, as well as to protect the crystal. The lubricant carrying the debris is removed from the housing 19 through a pipe 23 for suitable disposal, or is recirculated to given an integral wear measurement.

The principle and operation of the scintillation counter are well known and need not be discussed here at length. It is sufficient to state that part or all of the energy of each gamma ray emitted by the radioactive fluid in housing 19 that interacts with the scintillation crystal is converted into a number of photons which is proportional to the energy lost by the gamma ray.

When crystals are designed with collimation so that the gamma rays have relatively long paths for absorption, the probability of total loss of energy to the crystal is high, so that most of the scintillations from gamma rays of a single energy will consist of a number of photons corresponding to this energy.

The photons, on passing through the light-sensitive surface between the crystal 20 and the electron multiplier 21, are transformed into a proportional number of electrons. The number of these electrons is therefore also proportional to the energy lost by the gamma ray in the crystal. The electron multiplier multiplies these photoelectrons by a factor such as $10^6$ and delivers them to the amplifier unit 25 which in turn passes them to the adjustable discriminator unit 26 in the form of electrical pulses. The discriminator discards all pulses below an adjustable set value and transmits those above this value to a suitable indicator to be counted.

Fig. 2 diagrammatically illustrates the type of voltage pulses occurring with time by the absorption of gamma rays from a mixture of $Fe^{59}$ and $Cr^{51}$ by a scintillation spectrometer. Most of these pulses correspond to the 1.1 and 1.3 m. e. v. gamma rays of $Fe^{59}$ and the 0.32 m. e. v. gamma rays of $Cr^{51}$. If the discriminator is set at voltage corresponding to $a$, only the large pulses from $Fe^{59}$ register, while setting it at $b$ will permit pulses from both isotopes to register. Fig. 3 shows the same effect, with the number of pulses per unit time being derived from the areas under the respective portions of the curves. It is obvious that accumulation of debris will increase the frequency of pulses recorded, and that by prior calibration with appropriate discriminator settings, using standard solutions containing some of the dissolved metal sample, absolute concentrations of $Fe^{59}$ and $Cr^{51}$ in the fluid may be determined. It is also clear that where an isotope such as $Co^{60}$ is used, where two gamma rays are emitted simultaneously, that absorption of both of these gamma rays of energies 1.17 and 1.33 m. e. v. by a suitably constructed scintillation crystal will produce scintillations of the order expected for absorption of the sum of the energies of the two rays or 2.50 m. e. v., and that this technique can permit differentiation in this instance from rays of isotopes producing only single gamma rays of equivalent energies per disintegration.

It is understood that instead of counting the $Fe^{59}$ and the $Cr^{51}$ pulses consecutively as described above, these pulses may be counted simultaneously by using two scalers 31 in combination with discriminators adjusted to desired threshold voltages.

Likewise, instead of connecting the outputs of the discriminators to the scalers, they may be connected to suitable recorders 32 to form therewith continuous records of each pulse frequency vs. wear time, thus recording gear wear vs. wear time.

If it is desired to measure the respective amounts of wear of two members, such as gears, piston rings, bearings, etc., made of the same material or alloy, this measurement can also be effected by the present method by taking advantage of the difference in the activity-time relationships of different isotopes during activation and/or decay periods, as will be described hereinbelow with regard to a specific example.

If two gears or other members each consisting of or comprising an identical alloy of for example 70 percent iron and 30 percent chromium, are subjected to pile activation with a flux of $10^{12}$ neutrons /cm.$^2$/sec., the specific activity of the $Fe^{59}$ formed, as expressed in gamma rays emitted per minute per microgram of alloy may be represented by curve 41 of Fig. 4, said activity reaching a theoretical maximum of 4140 gamma rays per minute per microgram whereas the specific activity of $Cr^{51}$, which may be represented by curve 42, reaches under the same conditions a maximum of 1210 gamma rays per minute per microgram. It may be noted from Fig. 4 that the theoretical specific activity ratio of the two isotopes has thus a value of 3.42:1 at infinite time, of 4.85:1 after an activation period of 28 days, and 5.90:1 after an activation period of 3 days.

Figure 5:
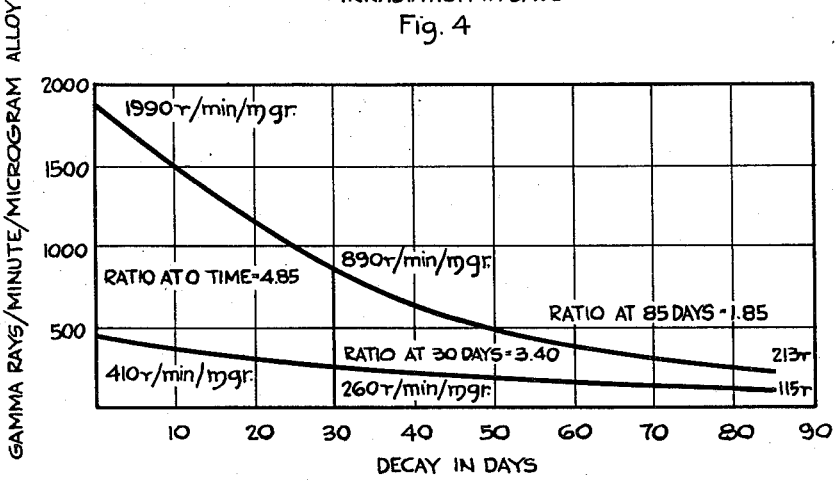

Similarly, by referring to Fig. 5, it will be seen that if the two gears are both identically irradiated for 28 days, and their energies are then allowed to decay, the ratios of said specific activity will have a value of 3.4:1 on the 30th day after the end of the irradiation period and of 1.85:1 on the 85th day after said end.

In accordance with the above, the respective amounts of frictional attrition of each said two gears may be determined in the following manner by the present method.

The first gear is subjected to irradiation for a period of, say, 28 days and its energy is then allowed to decay. On the 82nd day of this decay period, the irradiation of the second gear is started and carried for 3 days. The gears are then subjected to the frictional test described hereinabove (this being on the 85th day of decay of the first gear and the 3rd day of activation of the second gear). From Figs. 4 and 5 it will be seen that while the total specific activities in gamma rays per minute per microgram in the two gears are at that time of similar orders (213 for $Fe^{59}$ plus 115 for $Cr^{51}$ for the first gear, and 314 for $Fe^{59}$ plus 53 for $Cr^{51}$ for the second gear), the specific activity ratios of the two isotopes in each of the two gears differ widely, being 2:1 for the first gear and 5:1 for the second gear.

It is therefore obvious that if the present method, as described with regard to Fig. 1, is applied to these two gears, the ratio of the count of high-amplitude pulses (due to $Fe^{59}$ gammas) to the low-amplitude pulses (due mainly to $Cr^{51}$ gammas) will be a function of the relative amounts of wear products from the first and the second gears. For example, if said ratio were low, corresponding to the isotope mixture from the first gear, it would indicate that only the first gear is subject to attrition. If said ratio were high, corresponding to the isotope mixture from the second gear, it would indicate that only the second gear is subject to attrition. If, however, the scaler or rate-meter registers an intermediate ratio, it can be readily seen that the wear occurred with both gears, and the respective amounts of wear can be calculated by interpolation. By suitably calibrating the present system in a manner already described hereinabove, the respective amounts of wear of the first and of the second gear can be accurately calculated.

It is understood that all the elements, isotopes, activation and decay periods, etc. have been chosen and given hereinabove only for the purpose of numerically illustrating the method of this invention, and that any other suitable elements, isotopes, periods, etc. may as well be used, being readily selected from available literature sources.

It is also understood that the present method is not necessarily run as a continuous process, as described with regard to Fig. 1. Instead, the friction test may be run for a desired period without radioactive measurements being made. The lubricant is then removed from the testing machine, and the housing 19 and gears 11 and 12 are washed with a solvent for the lubricant, which is added to said lubricant. The scintillation counter is then brought into the proximity of the radioactive fluid thus obtained, and the desired measurements are carried out in the manner described hereinabove.

I claim as my invention:

1. The method of determining the respective wear of two metallic members in moving contact with each other, comprising the steps of subjecting said two members to a radioactivation treatment adapted to transform a part of the material of the first member into an isotope having a predetermined value of gamma ray energy, and a part of the material of the second member is transformed into an isotope having a value of gamma ray energy different from said first value, subjecting said two members to mutual attrition in the presence of a fluid capable of carrying radioactive wear debris, measuring the gamma radioactivity of the fluid carrying said debris due to the presence therein of the first isotope, and measuring the gamma radioactivity of the fluid carrying said debris due to the presence therein of the second isotope.

2. The method of claim 1, wherein the measurement of the radioactivity of said fluid comprises the steps of measuring the energy level of the gamma rays emitted by said fluid, counting gamma rays emitted by said first isotope separately from gamma rays emitted by said second isotope, said rays having energies of respectively predetermined values, and measuring the number of gamma rays emitted per unit time by the first isotope and the number of gamma rays emitted per unit time by said second isotope to determine the respective concentrations of said two isotopes in said fluid.

3. The method of claim 1, wherein the measurement of the radioactivity of said fluid comprises transforming the gamma rays emitted thereby into electrical pulses having an amplitude distribution related to the energy of said gamma rays, applying the distribution to count separately pulses produced by gamma rays from said first isotope and the pulses produced by gamma rays from said second isotope, the pulses produced by the gamma rays of said two isotopes having amplitudes respectively below and above a predetermined value, and measuring the amounts of pulses having amplitudes respectively below and above said predetermined value to determine the relative concentrations of said two isotopes in said fluid.

4. The method of determining the respective wear of two metallic members made of like alloys in moving contact with each other, comprising the steps of subjecting said two members to a radioactive treatment whereby a part of the material of said members is transformed into an isotope having a predetermined value of gamma ray energy and another part thereof is transformed into another isotope having a different value of gamma ray energy, said treatment being carried for said second member at a time separated from the treatment time of said first member by a predetermined significant time period, subjecting said two members to mutual attrition in the presence of a fluid capable of carrying radioactive wear debris, causing the gamma rays emitted thereby to be translated into electrical pulses having an amplitude distribution characteristic of said gamma rays, measuring said amplitude to separate pulses produced by gamma rays from said first isotope from the pulses produced by gamma rays from said second isotope, the pulses produced by the gamma rays of said two isotopes having amplitudes of predetermined different values related to the respective gamma ray energies of said two isotopes, and measuring the ratio of the amount of the pulses due to the first isotope to the amount of pulses due to the second isotope to determine the relative concentration in said fluid of radioactive debris from said first and said second members respectively.

5. The method of claim 4, wherein one of said members is subjected to radioactivation for a time considerably longer than the other member.

6. The method of claim 4, wherein one of said members is subjected to radioactivation for a time considerably shorter than its half-life period, and the other member is subjected to radioactivation for a time longer than its half-life period.

7. The method of claim 4, wherein the attrition test is carried out at a time falling within the first half-life period following activation for one of said isotopes and subsequent thereto for the other isotope.

8. The method of claim 4, wherein the attrition test is carried out a short time after activation of one member, and a relatively long time after activation for the second member.

References Cited in the file of this patent

UNITED STATES PATENTS

| 2,315,845 | Ferris | Apr. 6, 1943 |
| 2,751,506 | Black et al. | June 19, 1956 |

OTHER REFERENCES

Radioactive Isotopes as Tracers by A. W. Kramer, from Power Plant Engineering, Nov. 1947, pgs. 105 to 108.